US008519574B2

(12) United States Patent
Jung

(10) Patent No.: US 8,519,574 B2
(45) Date of Patent: *Aug. 27, 2013

(54) LENS DRIVING MOTOR AND ELASTIC MEMBER OF THE SAME

(71) Applicant: LG Innotek Co., Ltd., Seoul (KR)

(72) Inventor: Soo Jin Jung, Daegu (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,050

(22) Filed: Oct. 15, 2012

(65) Prior Publication Data
US 2013/0038955 A1 Feb. 14, 2013

Related U.S. Application Data

(63) Continuation of application No. 13/221,455, filed on Aug. 30, 2011, now Pat. No. 8,314,520, which is a continuation of application No. 13/051,517, filed on Mar. 18, 2011, now Pat. No. 8,030,806, which is a continuation of application No. 11/910,151, filed as application No. PCT/KR2006/005085 on Nov. 29, 2006, now Pat. No. 7,932,648.

(30) Foreign Application Priority Data

Dec. 2, 2005 (KR) .................. 10-2005-0117243

(51) Int. Cl.
H02K 33/00 (2006.01)
H02K 35/00 (2006.01)
G02B 7/02 (2006.01)

(52) U.S. Cl.
USPC ............ 310/15; 359/822; 359/824; 396/144; 396/89; 396/85; 369/44.15; 369/44.22

(58) Field of Classification Search
USPC .................. 310/15; 359/822, 824; 396/144, 396/89, 85; 369/44.15, 44.22
See application file for complete search history.

(56) References Cited

U.S. PATENT DOCUMENTS 2,357,327 A 9/1944 Harris et al.
3,251,028 A 5/1966 Haggard
(Continued)

FOREIGN PATENT DOCUMENTS

CN 1514296 A 7/2004
JP 62-262836 A 11/1987
(Continued)

OTHER PUBLICATIONS

Office Action dated Jun. 28, 2011 in Japanese Application No. 2008-543193, filed Jul. 2, 2007.

(Continued)

Primary Examiner — Tran Nguyen
Assistant Examiner — Alex W Mok
(74) Attorney, Agent, or Firm — Saliwanchik, Lloyd & Eisenschenk

(57) ABSTRACT

Provided are a lens driving motor and an elastic member of the lens driving motor. The elastic member of a lens driving motor, the elastic member includes a first spring and a second spring. The second spring is different from the first spring and disposed together with the first spring on one side of a carrier to support the carrier. A first lead line of a coil and a first external power source are connected to the first spring, and a second lead line of the coil and a second external power source are connected to the second spring to supply power to the coil. Since the carrier can be assembled to other part after a (+) lead line and a (−) lead line of the coil are connected to the first and second springs, respectively, using solder, a process is simple and convenient.

7 Claims, 3 Drawing Sheets

(56) References Cited

U.S. PATENT DOCUMENTS

| | | | |
|---|---|---|---|
| 3,516,441 A | 6/1970 | McCormick | |
| 4,827,296 A | 5/1989 | Haraguchi et al. | |
| 5,307,103 A | 4/1994 | Machida | |
| 6,850,138 B1 | 2/2005 | Sakai | |
| 7,309,932 B2 | 12/2007 | Tseng | |
| 8,314,520 B2 * | 11/2012 | Jung | 310/15 |
| 2004/0165877 A1 | 8/2004 | Hsiao | |
| 2005/0180275 A1 | 8/2005 | Shiraki et al. | |
| 2005/0184607 A1 | 8/2005 | Nakajima et al. | |
| 2006/0140610 A1 | 6/2006 | Chang | |
| 2006/0202566 A1 | 9/2006 | Osaka | |

FOREIGN PATENT DOCUMENTS

| | | |
|---|---|---|
| JP | 63-046418 A | 2/1988 |
| JP | 05-107443 A | 4/1993 |
| JP | 2001-067697 A | 3/2001 |
| JP | 2002-365514 A | 12/2002 |
| JP | 2003-207708 A | 7/2003 |
| JP | 2003-295033 A | 10/2003 |
| JP | 2004-138992 A | 5/2004 |
| JP | 2004-280031 A | 10/2004 |
| JP | 2004-333995 A | 11/2004 |
| JP | 2005-128405 A | 5/2005 |
| JP | 2005-128392 A | 9/2005 |
| JP | 2005-234089 A | 9/2005 |
| JP | 2005-234098 A | 9/2005 |
| JP | 2005-234404 A | 9/2005 |
| JP | 2005-258355 A | 9/2005 |
| JP | 2006-058662 A | 3/2006 |
| JP | 2006-067562 A | 3/2006 |
| JP | 2007-108599 A | 4/2007 |
| WO | WO-2005/101083 A1 | 10/2005 |

OTHER PUBLICATIONS

Office Action dated Dec. 13, 2011 in Japanese Application No. 2008-543193, filed Nov. 29, 2006.

Office Action dated Apr. 19, 2012 in Chinese Application No. 200680002795.3, filed Nov. 29, 2006.

* cited by examiner

LENS DRIVING MOTOR AND ELASTIC MEMBER OF THE SAME

CROSS-REFERENCE TO RELATED APPLICATIONS

This application is a continuation of U.S. application Ser. No. 13/221,455, filed Aug. 30, 2011, which is a continuation of U.S. application Ser. No. 13/051,517, filed Mar. 18, 2011, now U.S. Pat. No. 8,030,806, issued Oct. 4, 2011, which is a continuation of U.S. application Ser. No. 11/910,151, filed Sep. 28, 2007, now U.S. Pat. No. 7,932,648, issued Apr. 26, 2011, which is the U.S. national stage application of International Patent Application No. PCT/KR2006/005085, filed Nov. 29, 2006, which claims priority to Korean Patent Application No. 10-2005-0117243, filed Dec. 2, 2005, all of which are incorporated herein by reference in their entirety.

TECHNICAL FIELD

The present invention relates to a lens driving motor and an elastic member of the lens driving motor.

BACKGROUND ART

As digital apparatuses provide diverse functions nowadays, digital apparatuses having a built-in camera are developed and used. Recently, there emerges a digital apparatus that automatically moves a lens of a camera built in the digital apparatus using a predetermined lens driving motor, thereby allowing a user of the digital apparatus to use the camera more conveniently.

The lens driving motor should be provided in a small size with consideration of miniaturization of the digital apparatus. Also, an inner portion of the lens driving motor, particularly, an electrical line through which a current flows should be stably connected, and reliability in accuracy for a movement amount of a lens should be excellent considering that the lens driving motor is an optical apparatus. Japanese Patent Publication No. 2004-280031 proposes a related art lens driving motor capable of the above-described purposed to some extent.

The Japanese Patent discloses a lens driving motor including a coil and a carrier coupled together, a lens coupled to the carrier, and a magnet installed on an outer side of the coil.

This related art lens driving motor operates in such a way that the carrier and the lens move in an upward direction using electromagnetic force generated between the coil and the magnet when a current flows through the coil. Also, one side of a spring is fixed to the carrier, and the other side of the spring is clamped by a yoke and caps of upper and lower portions so that a stop position of the carrier is indicated.

Meanwhile, according to the Japanese Patent, lead lines of a coil through which a current is applied to the coil are soldered at an upper spring and a lower spring, respectively, to receive external power via the upper spring and the lower spring.

However, the lead lines of the coil should be soldered at the upper and lower springs, respectively, during a process of assembling respective parts because of the structure of the related art lens driving motor. Since a lens driving apparatus has a very small volume of about 1.2-1.5 cm$^3$, a soldering operation should be performed in an inside of a narrow space, which reduces workability.

Also, due to a yoke shape where cross-sections are bent, the lead line of the coil should be inserted into a gap between the yoke and the carrier, extracted to an upper side, and then soldered at the upper spring when the lead line is soldered at the upper spring. These processes are more difficult to perform.

Also, since one end of the lead line of the coil is connected to the coil, of course, and move together with the coil, but the other end of the coil is fixed to a portion (e.g., the yoke) that moves independently of the coil, friction caused by contact and an external load are applied to the lead line. These problems generate deterioration of the lead line and reduce reliability of a product.

Technical Problem

An object of the present invention is to provide a lens driving motor and an elastic member of the lens driving motor for simply performing an assembling process because a lead line of a coil can be easily soldered to the elastic member, and for improving reliability of connection of a power line to the lead line of the coil.

Another object of the present invention is to provide a lens driving motor and an elastic member of the lens driving motor for improving reliability of an operation of a product and extending life.

Technical Solution

According to another aspect of the present invention, there is provided a lens driving motor including a base; a housing disposed on the base; a yoke fixed inside the housing; a magnet fixed inside the yoke; a carrier installed to be movable vertically in the inside of the yoke to raise a lens; a coil fixed to the carrier at a position facing the magnet; a first elastic member whose one end is coupled to at least one side of the carrier to provide elastic force to the carrier; and a second elastic member whose one end is coupled to at least the other side of the carrier to provide elastic force to the carrier, wherein the second elastic member includes a first spring and a second spring that are not electrically conducted, and an external power source having different polarities and a lead line of the coil having different polarities are connected to the first spring and the second spring, respectively.

According to another aspect of the present invention, there is provided a lens driving motor including: a base; a housing coupled on an upper side of the base; a yoke formed in a ring shape whose lower side is open and fixed on an inner peripheral surface of the housing; a ring-shaped magnet fixed on an inner peripheral surface of an outer wall of the yoke; a carrier installed to be movable vertically in an inside of an inner wall of the yoke, and having a central portion to which a lens is coupled; a coil fixed on an outer peripheral surface of the carrier to face the magnet; a ring-shaped upper elastic member having an inner peripheral side fixed on an upper outer peripheral portion of the carrier and having an outer peripheral side fixed on a portion between an upper surface of the yoke and the housing; and a lower elastic member where two springs separated from each other are circularly arranged in pairs, having an inner peripheral surface and an outer peripheral surface fixed to the carrier and the base, respectively, wherein a power source having different polarities and a lead line of the coil having different polarities are connected to the two springs, respectively.

According to further another aspect of the present invention, there is provided a lens driving motor including: a base; a housing coupled on an upper side of the base; a yoke formed in a ring shape whose lower side is open and fixed on an inner peripheral surface of the housing; a ring-shaped magnet fixed on an inner peripheral surface of an outer wall of the yoke; a carrier installed to be movable vertically in an inside of an inner wall of the yoke, and having a central portion to which a lens is coupled; a coil fixed on an outer peripheral surface of the carrier to face the magnet; a ring-shaped upper elastic member including a pair of two springs separated from each other, having an inner peripheral side fixed on an upper outer peripheral portion of the carrier, and having an outer peripheral side fixed on a portion between an upper surface of the yoke and the housing; a lower elastic member having an inner peripheral surface and an outer peripheral surface fixed to the carrier and the base, respectively, wherein a power source having different polarities and a lead line of the coil having different polarities are connected to the two springs of the upper elastic member, respectively.

According to yet another aspect of the present invention, there is provided a lens driving motor including an elastic member applied to an upper carrier, wherein the elastic member includes: a first spring; and a second spring that is different from the first spring and disposed together with the first spring on one side of a carrier to support the carrier, a first lead line of a coil and a first external power source are connected to the first spring, and a second lead line of the coil and a second external power source are connected to the second spring to supply power to the coil.

According to another aspect of the present invention, there is provided a lens driving motor including an elastic member applied to a lower carrier, wherein the elastic member includes: a first spring; and a second spring that is different from the first spring and disposed together with the first spring on one side of a carrier to support the carrier, a first lead line of a coil and a first external power source are connected to the first spring, and a second lead line of the coil and a second external power source are connected to the second spring to supply power to the coil.

According to further another aspect of the present invention, there is provided a lens driving motor including an elastic member applied to a yoke, wherein the elastic member includes: a first spring; and a second spring that is different from the first spring and disposed together with the first spring on one side of a carrier to support the carrier, a first lead line of a coil and a first external power source are connected to the first spring, and a second lead line of the coil and a second external power source are connected to the second spring to supply power to the coil.

According to further another aspect of the present invention, there is provided an elastic member of a lens driving motor, the elastic member including: a first spring; and a second spring which is different from the first spring and disposed together with the first spring on one side of a carrier to support the carrier, wherein a first lead line of a coil and a first external power source are connected to the first spring, and a second lead line of the coil and a second external power source are connected to the second spring to supply power to the coil.

Advantageous Effects

According to a lens driving motor of the present invention and an elastic member of the lens driving motor, since a carrier is assembled to other part after (+) and (−) lead lines of a coil are connected to a first spring and a second spring using solder, respectively, an assembling process is convenient. Also, since power connection of a lead line of the coil is stably performed, operational reliability of a product improves and life of a product extends.

Also, since a coil is stably supported and a power source having a pair of different polarities is connected using an elastic member on one side, an operator can easily perform an assembly process.

BRIEF DESCRIPTION OF DRAWINGS

FIG. 2 is a view illustrating a state before an external power source is applied, and FIG. 3 is a view illustrating an external power source is applied and a lens is raised.

DETAILED DESCRIPTION

Hereinafter, preferred embodiments of the present invention will be described in detail with reference to accompanying drawings.

Figure 1:
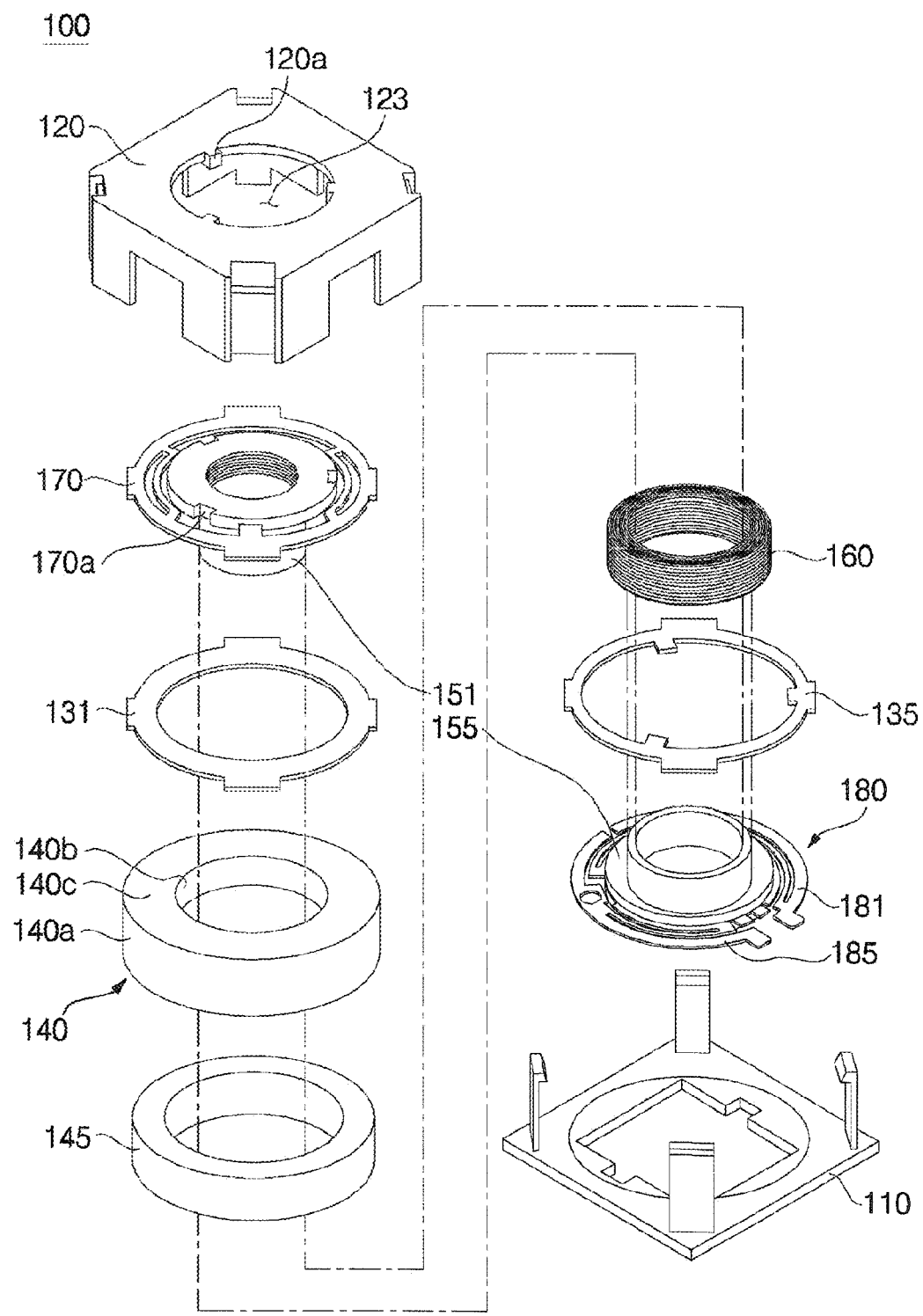
FIG. 1 is an exploded perspective view of a lens driving motor according to an embodiment of the present invention.
Figure 2:
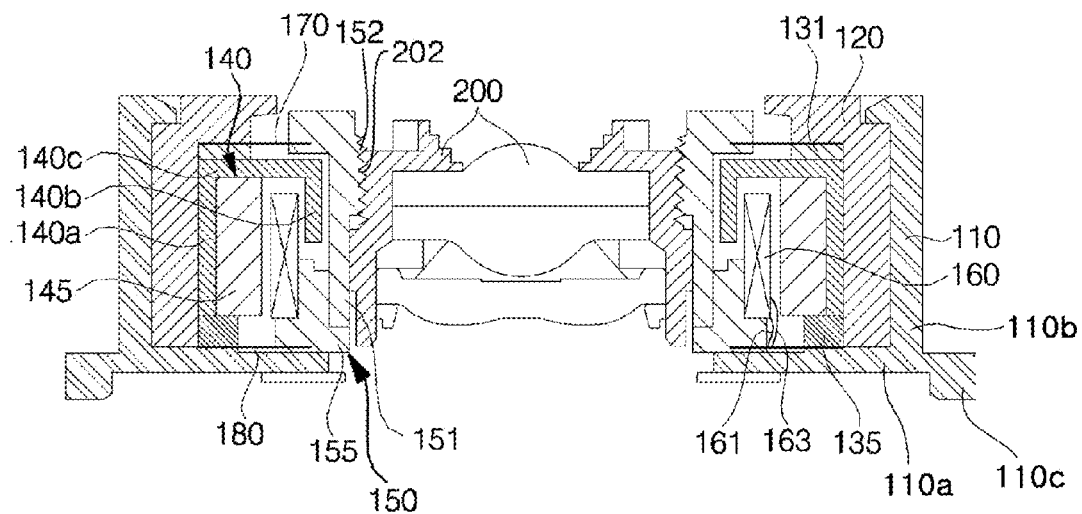
FIGS. 2 and 3 are cross-sectional views of the lens driving motor according to an embodiment of the present invention, where
Figure 3:
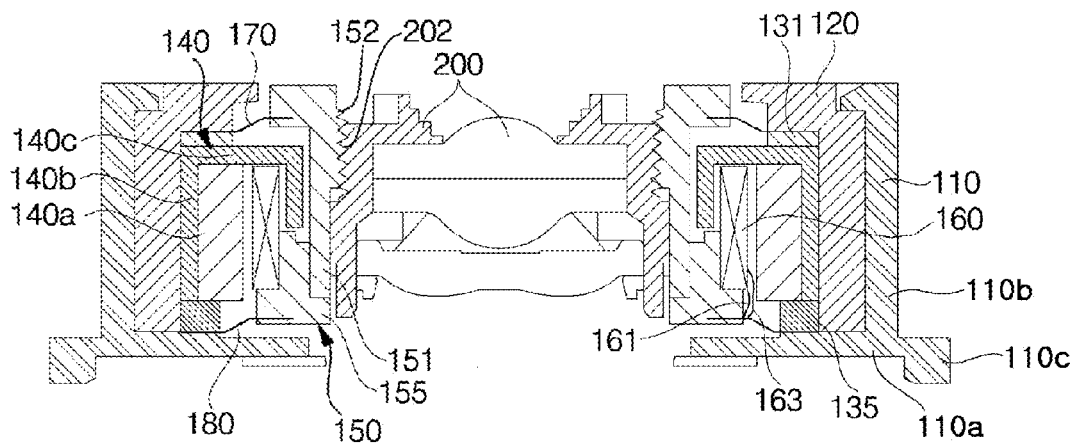

FIG. 1 is an exploded perspective view of a lens driving motor according to an embodiment of the present invention, and FIGS. 2 and 3 are cross-sectional views of the lens driving motor according to an embodiment of the present invention, explaining an operation of the lens driving motor. Referring to FIGS. 1 to 3, the lens driving motor 100 includes a base 110 and a housing 120 coupled to each other to constitute an appearance and form a predetermined space in an inside of the lens driving motor 100. The base 110 includes a plate 110a having an opening, at least one wall 110b coupled to the housing 120, and a supporter 110c extended downward from a peripheral portion of the plate 110a. The housing 120 is coupled on an upper surface of the base 110, and has an open lower surface. An opening 123 is formed in an upper surface of the housing 120 to allow a carrier 150 to move or transmit light. The housing 120 has at least one protrusion 120a extending into the opening 123.

Ring-shaped upper spacer 131 and lower spacer 135 having elasticity are disposed on outer upper and lower surfaces of the carrier 150, respectively. At this point, the upper spacer 131 touches an inner upper surface of the housing 120, and the lower spacer 135 touches an upper surface of the base 110. When mounted, the upper and lower spacers 131 and 135 expand and contract to compensate for dimension errors of parts assembled inside the housing 120 and tolerance caused by an assembly error generated during an assembling process.

A yoke 140 is pressed-in and fixed in a gap between the upper space 131 and the lower spacer 135. The yoke 140 is mounted on an inner surface of the housing 120, and provided in a ring shape having an outer wall 140a, an inner wall 140b, and an upper plate 140c, and an open lower surface. A movement limit of the carrier can be set by the yoke 140 having the above-described shape. Also, a ring-shaped magnet 145 is installed on an inner peripheral surface of the outer wall 140a of the yoke 140.

The carrier 150 is installed to be movable vertically on an inner surface of the inner wall 140b of the yoke 140. A lens 200 rising together with the carrier 150 is installed inside the carrier 150. The carrier 150 includes a female screw portion 152 and the lens 200 includes a male screw portion 202 that screws into the female screw portion 152 of the carrier 150. Consequently, a rising operation of the carrier 150 is accompanied with a rising operation of the lens 200, so that a position of the lens 200 is controlled during shooting. The carrier 150 includes an upper carrier 151 and a lower carrier 155 that are separated from each other so that the carrier 150 can be easily positioned inside the inner wall 140b of the yoke 140. The upper and lower carriers 151 and 155 are coupled to each other. During installation of the carrier 150, a lower portion of the upper carrier 151 is inserted into an inside of the lower carrier 155 via an upper portion of the lower carrier 155. When this process is completed, an upper surface of the upper carrier 151 is located on an upper surface of the yoke 140, and a lower surface of the lower carrier 155 is supported by the base 110. The upper carrier 151 includes at least one recess 170a on an outer circumference surface. The at least one protrusion 120a of the housing 120 corresponds to the at least one recess 170a of the upper carrier 151.

A wired coil 160 is fixed on an outer peripheral surface of the lower carrier 155. At this point, the coil 160 is located between the inner wall 140b of the yoke 140 and the magnet 145 to face the magnet 145 with a predetermined distance separated from the magnet 145. Therefore, referring to FIG. 3, when a current is supplied to the coil 160, the coil 160 is raised by interaction between an electric field generated from the coil 160 and a magnetic field generated from the magnet 145, which raise the carrier 150 and thus the lens 200.

After that, when the applied electromagnetic force disappears, the carrier 150 that has been raised by the electromagnetic force is restored back to its original position by upper and lower elastic members 170 an 180 including a plurality of ring-shaped elastic members having different diameters and connected to each other.

A position relation and operation of the upper and lower elastic members 170 and 180 will be described below in detail. First, an inner side portion of the upper elastic member 170 is integrally fixed on an outer upper portion of the upper carrier 151 by injection molding, and an outer side portion is fixed between the upper spacer 131 and the housing 120. Also, an inner side portion of the lower elastic member 180 is integrally fixed on an outer lower portion of the lower carrier 155 by injection molding, and an outer side portion is fixed between the lower spacer 135 and the base 110.

Therefore, when a current is supplied to the coil 160 in an initial state of FIG. 2, the coil 160 is raised by electromagnetic force between the coil 160 and the magnet 145 as illustrated in FIG. 3, so that the carrier 150 and the lens 200 are raised. Here, the inner side portions of the upper and lower elastic members 170 and 180 are fixed in the carrier 150, and the outer side portions are fixed between the upper spacer 131 and the housing 120, and between the lower spacer 135 and the base 110, respectively. Therefore, when the carrier 150 rises, the inner side portions of the upper and lower elastic members 170 and 180 also rise as the carrier 150 does.

After that, when a current that has been supplied to the coil 160 is cut off, the carrier 150 is restored back to the initial state illustrated in FIG. 2 by elastic force of the upper and lower elastic members 170 and 180.

The coil 160 receives external power via a spring. A power application operation will be descried below in detail.

The lower elastic member 180 of the motor 100 according to an embodiment of the present invention includes a first spring 181 and a second spring 185 separated from each other and constituting a ring shape. Also, a (+) lead line 161 of the coil 160 and an external (+) power are connected to the first spring 181, and a (−) lead line 163 and an external (−) power are connected to the second spring 185.

A lower elastic member according to an embodiment of the present invention will be described below in detail.

Figure 4:
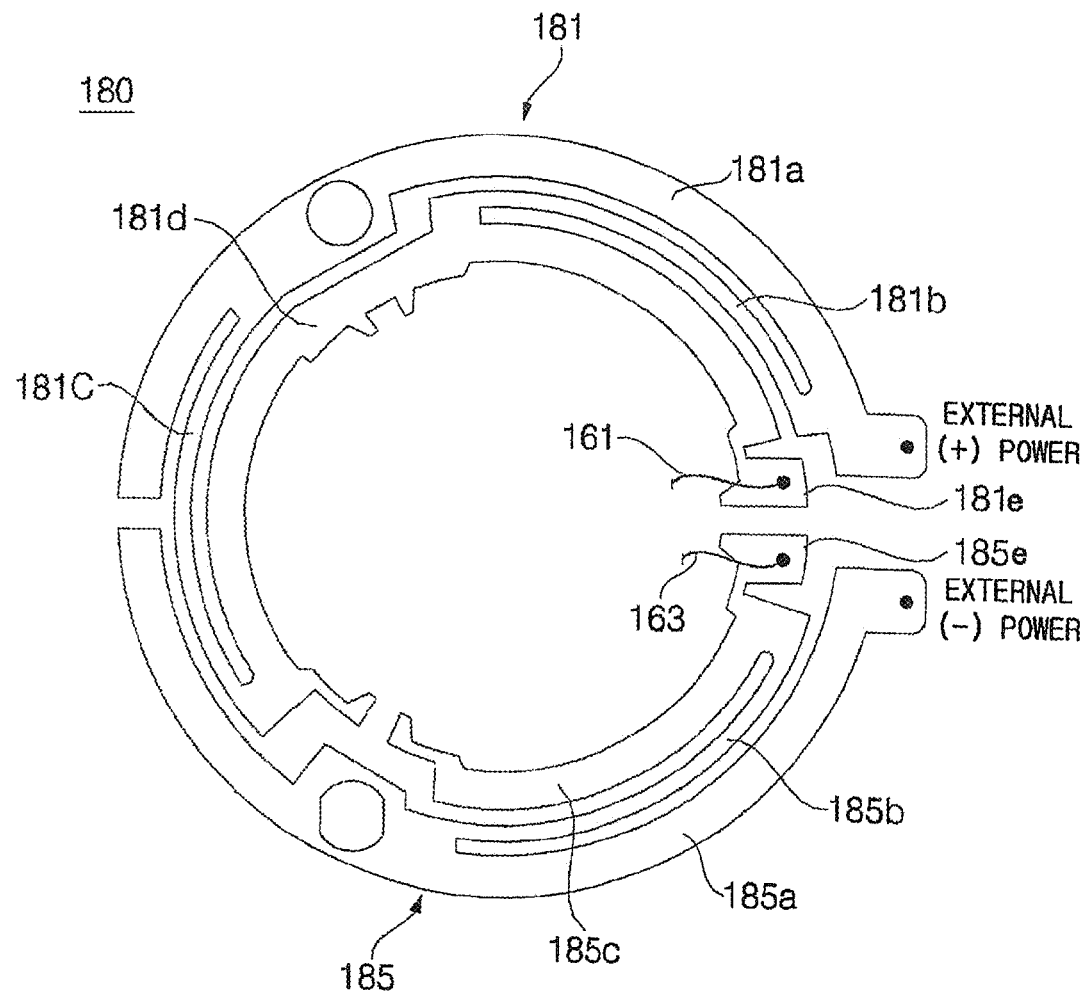
FIG. 4 is a plan view of a lower elastic member according to an embodiment of the present invention.

FIG. 4 is a plan view of a lower elastic member according to an embodiment of the present invention. Referring to FIG. 4, the first spring 181 includes a semicircle-shaped outer portion 181a, a transition portion having arc-shaped first and second transition portions 181b and 181c, and an arc-shaped inner portion 181d.

In detail, the outer portion 181a is formed in a semicircle shape and inserted and fixed between the lower spacer 135 and the base 110. Also, the external (−) power is connected to one side of the outer portion 181a.

Also, the first transition portion 181b is located between the coil 160 and the magnet 145 with a predetermined distance separated from an inner surface of the outer portion 181a. Also, the first transition portion 181b integrally extends from one end of the outer portion 181a up to an about central portion of the outer portion 181a. That is, the first transition portion 181b constitutes a cantilever.

The second transition portion 181c is also located between the coil 160 and the magnetic 145 with a predetermined distance separated from an inner surface of the outer portion 181a. Also, the second transition portion 181c is separated a predetermined distance from one end of the first transition portion 181b, and extends up to an outer side of the other end of the outer portion 181a via an about central portion of the outer portion 181a. That is, the second transition portion 181c constitutes a cantilever shape. The transition portion elastically prevents deformation of the spring when the spring moves.

The inner portion 181d is integrally formed with the transition portions 181b and 181c with a predetermined distance from inner surfaces of the first and second transition portions 181b and 181c. The inner portion 181d is fixed on a lower side of the carrier 150. One end of the inner portion 181d is located to correspond to one end of the outer portion 181a, and connected to the (+) lead line 161 of the coil 160. Also, an end extending from the first transition portion 181b and an end extending from the second transition portion 181c are integrally connected to one side and one end of a central portion of the inner portion 181d.

Meanwhile, the second spring 185 includes a semicircle-shaped outer portion 185a, an arc-shaped transition portion 185b, and an arc-shaped inner portion 185c.

In detail, the outer portion 185a of the second spring 185 is formed in a semicircle shape and inserted and fixed between the lower spacer 135 and the base 110. One end and the other end of the outer portion 185a of the second spring 185 face each other with a predetermined distance separated from an end of the outer portion 181a of the first spring 181. The outer portion 185a of the second spring 185 and the outer portion 181a of the first spring 181 form a ring shape on the whole. Here, the external (−) power is connected to one end of the outer portion 185a of the second spring 185, and an inner surface of the other end of the outer portion 185a is separated a predetermined distance from an end extending from the second transition portion 181c of the first spring 181.

The transition portion 185b of the second spring 185 is separated a predetermined distance from the outer portion 185a of the second spring 185, and is located between the coil 160 and the magnet 145. Also, one end of the transition portion 185b of the second spring 185 is located at one end of the outer portion 185a of the second spring 185, and the other end of the transition portion 185b is integrally connected to an inside located on one side of a central portion of the outer portion 185a of the second spring 185. That is, the transition portion 185b of the second spring 185 constitutes a cantilever shape.

The inner portion 185c of the second spring 185 is separated a predetermined distance from the transition portion 185b of the second spring 185 and fixed at a lower portion of the carrier 150. Also, one end of the inner portion 185c of the second spring 185 is integrally formed with an inner surface of one end of the transition portion 185b of the second spring 185 to face one end of the inner portion 181d of the first spring 181. The other end of the inner portion 185c of the second spring 185 is located at the other end of the transition portion 185b of the second spring 185 to face the other end of the inner portion 181d of the first spring 181. The (−) lead line 163 of the coil 160 is connected to one end of the inner portion 185c of the second spring 185.

As described above, the first spring 181 and the second spring 185 are separated from each other. the external (+) and (−) powers are connected to the outer portions 181a and 185a of the first and second elastic members 181 and 185, respectively. The (+) and (−) lead lines 161 and 163 of the coil 160 are connected to the inner portions 181d and 185c of the first and second springs 181 and 185, respectively. Therefore, the coil 160 receives the external power via the single lower elastic member 180. Of course, the springs 181 and 185 are formed of a conductive material to supply power.

Referring to FIG. 1 again, the carrier 150 includes the upper carrier 151 and the lower carrier 155 coupled to each other. The coil 160 and the lower elastic member 180 are fixed to the lower carrier 155. Therefore, after the (+) and (−) lead lines 161 and 163 of the coil 160 are connected to the lower elastic member 180 using solder with the coil 160 fixed at the lower carrier 155, the lower carrier 155 can be assembled between the base 110 and the housing 120. Therefore, the (+) and (−) lead lines 161 and 163 of the coil 160 can be easily soldered to the lower elastic member 180, so that an assembling of the motor and an entire manufacturing process of the motor are simplified.

Also, since connection terminals of the lead lines 161 and 163 of the coil 160 rise vertically together with the springs, stress is not applied to soldered portions by relative movements of the coil 160 and the lead lines 161 and 163. Accordingly, it is expected that reliability of a product improves.

Meanwhile, the first and second springs 181 and 185 can be integrally fixed to the lower carrier 155 by insert injection. In other words, after a conductive metal plate is manufactured in a spring shape through cut/processing procedures, the first and second springs 181 and 185 are integrally formed in the lower carrier 155 during the lower carrier 155 is injected with the springs 181 and 185 inserted into the inside of a mold used for manufacturing the lower carrier 155. At this point, one sides at one ends of the inner portions 181d and 185c of the first and second springs 181 and 185 protrude to an outer side of the carrier 150, which is intended for connecting the (+) and (−) lead lines 161 and 163 of the coil 160 to protrusions 181e and 185e using solder.

Since the springs 181 and 185 can be integrally fixed in the carrier 155 using insert injection, fixing the spring can be performed more conveniently, and operational reliability of a product improves.

Mode for Invention

The upper elastic member 170 of the present invention can be coupled to the lower elastic member through the same shape and structure. In the case where the upper elastic member and the lower elastic member have the same shape and structure, the upper and lower elastic members can be provided to be symmetrical with each other. Meanwhile, in the case where the upper and lower elastic members have different shapes, they can be provided to be asymmetrical with each other.

Also, the upper elastic member can be provided to have the same shape and structure as those of the lower elastic member described in the above embodiment. In this case, an external power source and a coil can be connected to the upper elastic member, not the lower elastic member, of course. Even in this case, since a stable support operation by the elastic member is achieved and the external power source and the coil can be connected to the elastic member by inserting the coil in one direction (using the upper elastic member), convenience in mounting the coil can be accomplished, of course.

Also, the upper elastic member can be provided in the same shape descried in one embodiment to the yoke. In this case, an external power source and a coil can be connected to the upper elastic member, not the lower elastic member, of course. Even in this case, since a stable support operation by the elastic member is achieved and the external power source and the coil can be connected to the elastic member by inserting the coil in one direction (using the upper elastic member), convenience in mounting the coil can be accomplished, of course.

Also, it is natural that (+) and (−) directions of the coil 160 with respect to the spring can change depending on a magnetized direction of the magnet 145. This case also comes within the spirit of the present invention, of course.

Depending on cases, at least one of the springs provided to the lower elastic member is not insert-injected into the base but would be coupled to the base using other method afterward.

Also, though an outer fixing end of the upper elastic member has been descried to be fixed between the housing and the upper spacer, there is no limitation. The outer fixing end can be fixed to any portion (e.g., the housing and the yoke) of the lens driving motor that does not move. Also, though an outer fixing end of the lower elastic member has been descried to be fixed between the lower spacer and the housing, there is no limitation. The outer fixing end of the lower elastic member can be fixed to any portion (e.g., the base and the yoke) of the lens driving motor that does not move, which also comes within the spirit of the present invention.

Though the spring has been described to have an arc shape according to the present invention, the arc shape is a mere exemplary shape and any shape that can stably and substantially support the carrier can be used.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

According to the present invention, since a lead line of a coil can be easily soldered to the elastic member, an assembling process can be simply performed, and reliability of power connection with respect to the lead line of the coil improves. Also, operational reliability of a product improves and life of a product extends. Also, since a process of coupling the spring to the carrier is convenient and solid, reliability of a product improves and convenience in performing an assembling process is enhanced even more.

What is claimed is:

1. A lens driving motor comprising:
   a base;
   a yoke disposed on the base;
   a carrier installed to be movable vertically in the inside of the yoke, wherein the carrier includes a female screw portion on an inner circumference surface thereof;
   a magnet coupled to one of the yoke and the carrier;

a lens assembly disposed in the carrier, wherein the lens assembly includes a male screw portion on an outer circumference thereof, wherein the lens assembly is screwed into the carrier;

a coil fixed to other of the yoke and the carrier at a position facing the magnet; and an elastic member coupled to the carrier to provide elastic force to the carrier.

2. The lens driving motor according to claim 1, wherein the elastic member includes a first spring and a second spring electrically separated from the first spring;

wherein the first spring includes an outer portion, an inner portion, and a transition portion, wherein the outer portion of the first spring is separated from the inner portion of the first spring, wherein the transition portion of the first spring connects the outer portion of the first spring with the inner portion of the first spring, and wherein the transition portion of the first spring is extended from a portion between one end of the inner portion of the first spring and the other end of the inner portion of the first spring to a portion between one end of the outer portion of the first spring and the other end of the outer portion of the first spring;

wherein the second spring includes an outer portion, an inner portion, and a transition portion, wherein the outer portion of the second spring is separated from the inner portion of the second spring, wherein the transition portion of the second spring connects the outer portion of the second spring with the inner portion of the second spring, and wherein the transition portion of the second spring is extended from a portion between one end of the inner portion of the second spring and the other end of the inner portion of the second spring to a portion between one end of the outer portion of the second spring and the other end of the outer portion of the second spring; and wherein the first spring and the second spring are disposed on a same horizontal plane.

3. The lens driving motor according to claim 1, wherein the outer portion of the first spring is connected to a first external power source, wherein the outer portion of the second spring is connected to a second external power source, and wherein the first power source and the second power source have different polarities from each other.

4. The lens driving motor according to claim 1, wherein the first external power source is connected to the one end of the outer portion of the first spring, wherein the second external power source is connected to the one end of the outer portion of the second spring, wherein the one end of the outer portion of the first spring is closer to the one end of the outer portion of the second spring than to the other end of the outer portion of the second spring.

5. The lens driving motor according to claim 1, wherein a portion of the first spring is overlapped with a portion of the second spring in a radial direction.

6. The lens driving motor according to claim 1, wherein the first spring and the second spring have an asymmetrical structure.

7. The lens driving motor according to claim 1, wherein at least one of the first spring and the second spring has at least two transition portions.

* * * * *